(12) United States Patent
Elizalde et al.

(10) Patent No.: US 10,031,740 B2
(45) Date of Patent: Jul. 24, 2018

(54) METHOD FOR PROGRAMMING VEHICLE ELECTRONIC CONTROL MODULES

(71) Applicant: LEAR CORPORATION, Southfield, MI (US)

(72) Inventors: Ricardo Martinez Elizalde, Valls (ES); Ronald W Pashby, Raleigh, NC (US); Antoni Ferre Fabregas, Valls (ES)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/420,349

(22) Filed: Jan. 31, 2017

(65) Prior Publication Data

US 2018/0113702 A1   Apr. 26, 2018

Related U.S. Application Data

(60) Provisional application No. 62/412,212, filed on Oct. 24, 2016.

(51) Int. Cl.

| | |
|---|---|
| *G06F 9/44* | (2018.01) |
| *G06F 8/65* | (2018.01) |
| *G06F 9/445* | (2018.01) |
| *G06F 8/41* | (2018.01) |
| *G06F 8/654* | (2018.01) |
| *B60W 50/00* | (2006.01) |

(52) U.S. Cl.
CPC .................. *G06F 8/65* (2013.01); *G06F 8/41* (2013.01); *G06F 8/654* (2018.02); *G06F 8/665* (2013.01); *B60W 50/00* (2013.01); *B60W 2050/0077* (2013.01); *B60W 2050/0083* (2013.01)

(58) Field of Classification Search
CPC ........................................................ G06F 8/65
USPC .................................. 717/168–177; 709/203
See application file for complete search history.

(56) References Cited

U.S. PATENT DOCUMENTS

| | | | | |
|---|---|---|---|---|
| 4,658,370 A | * | 4/1987 | Erman ................... | G06N 5/022 706/11 |
| 5,875,334 A | * | 2/1999 | Chow ..................... | G06F 8/427 717/139 |

(Continued)

OTHER PUBLICATIONS

Hutcheon et al, "Specifying restrictions on imperative programming languages for use in a distributed embedded environment",Software Engineering Journal, pp. 93-104, 1990.*
Pankratius et al, "Combining Functional and Imperative Programming for Multicore Software: An Empirical Study Evaluating Scala and Java", IEEE, pp. 123-133, 2012.*
Hosobe, "Toward a New Constraint Imperative Programming Language for Interactive Graphics", ACM, pp. 34-35, 2016.*
Radoi et al, "Translating Imperative Code to MapReduce", ACM, pp. 909-927, 2014.*

(Continued)

*Primary Examiner* — Anil Khatri
(74) *Attorney, Agent, or Firm* — Donald J Lenkszus (57) ABSTRACT

A method is provided for generating a reprogramming file to reprogram a target electronic control unit (ECU) in a target vehicle. High-level language diagnostic commands are generated utilizing a standardized specification language editor comprising Open Test sequence data eXchange (OTX). High-to-low level command conversions specific for the target ECU generate Unified Diagnostic Services (UDS) operation transactions. The high-level language diagnostic sequence commands are converted into imperative language instructions-that are compiled into binary code corresponding to handling routines. A binary image of the target ECU is segmented into a plurality of data blocks. The plurality of data blocks and respective the UDS operation transactions are compiled to provide a plurality of UDS stages that are assembled into the reprogramming file.

21 Claims, 8 Drawing Sheets

(56) References Cited

U.S. PATENT DOCUMENTS

| | | | | |
|---|---|---|---|---|
| 7,299,410 B2* | 11/2007 | Kays | ................ | G06F 17/30908 |
| | | | | 707/E17.122 |
| 7,730,462 B2* | 6/2010 | Grieskamp | ............... | G06F 8/31 |
| | | | | 717/136 |
| 8,041,554 B1* | 10/2011 | Limondin | ................. | G06F 8/35 |
| | | | | 703/22 |
| 8,239,820 B1* | 8/2012 | White | ................. | G06F 11/3688 |
| | | | | 717/100 |
| 8,793,240 B2* | 7/2014 | Potapov | ............ | G06F 17/30436 |
| | | | | 707/713 |
| 9,008,854 B2* | 4/2015 | Breed | ................... | G01C 21/26 |
| | | | | 701/1 |
| 9,274,785 B2* | 3/2016 | Jung | ....................... | H04L 67/12 |
| 9,489,283 B1* | 11/2016 | Popovici | ............ | G06F 11/3636 |
| 9,600,266 B2* | 3/2017 | Molin | ...................... | G06F 8/65 |

OTHER PUBLICATIONS

Staender et al, "Adaptive Workflows in Smart Environments: Combining Imperative and Declarative Models ", ACM, pp. 1171-1174, 2012.*

Coppola et al, "Connected Car: Technologies, Issues, Future Trends", ACM Computing Surveys, vol. 49, No. 3, article 46, pp. 1-36, 2016.*

Svangren et al, "The Connected Car: An Empirical Study of Electric Cars as Mobile Digital Devices", ACM, pp. 1-12, 2017.*

* cited by examiner

203x

METHOD FOR PROGRAMMING VEHICLE ELECTRONIC CONTROL MODULES

FIELD OF THE INVENTION

The present invention pertains to programming and reprogramming of vehicle electronic control units or modules.

BACKGROUND OF THE INVENTION

Vehicle systems are typically controlled by one or more electronic control units (ECUs) or electronic control modules. Each ECU comprises software that is updated from time to time for various purposes including providing corrections, improvements and enhancements. The software is typically stored in a flash memory.

Typically such updates are installed by the vehicle owner bringing the vehicle to a dealer or service center for update installation, often in response to receiving a notification from the vehicle manufacturer. The costs for providing and installing updates are passed on from the dealer to the vehicle manufacturer. Those costs are a significant expense for vehicle manufacturers when the updates are performed at vehicle dealerships. In addition, the vehicle owner is inconvenienced by having to bring the vehicle to the dealer and spending time at the dealer to have the updates installed. Still further, vehicle owners may not receive the update notices or may decide not to have the updates added because of the inconvenience.

Over-the-Air (OTA) programming, also called Firmware Over-the-Air (FOTA) is a procedure of remotely updating software that has previously been utilized in the telecommunications industry for mobile wireless devices such as cellular phones, personal digital assistants and the like. However, in the automotive industry, FOTA has had limited use.

An established procedure of ECU reprogramming utilizes a wired connection and a diagnostic tool. The wired connection is direct between the diagnostic tool and a vehicle gateway.

Modern vehicle diagnostic systems are configured to execute XML scripts. This approach is standardized and utilizes an output script compiled in a script language, in particular in Open Test sequence data eXchange (OTX). Additionally, a standardized description language, i.e., Open Diagnostic Data Exchange (ODX) that provides fundamental information for software configuration is utilized. ODX is standardized in international standard ISO 22901-1.

ODX and OTX files are stored as XML files and could occupy several Mbytes of memory. A typical diagnostics tool integrates an XML interpreter of the ODX/OTX protocols and sends the instructions to a vehicle gateway.

It is possible to provide vehicles with a vehicle gateway that runs powerful operating systems such as Linux than can integrate an XML interpreter, as done in garage diagnostics tools. However, these modules require large FLASH and RAM memories and have a very high cost. The cost is prohibitive for low-end vehicles.

It is therefore desirable to have a system and method to perform the OTA vehicle programming with limited hardware resources, both in terms of FLASH and RAM memories and CPU throughput.

SUMMARY

Embodiments of methods and systems for re-programming and re-flashing ECUs in vehicles are provided. The various embodiments are such that memory requirements of an infotainment/gateway ECU are optimized and minimized.

An embodiment of a system to generate a reprogramming file for reprogramming a target electronic control unit (ECU) in a target vehicle comprises a memory and one or more processors programmed to: extract high-to-low level command conversions specific for the target ECU from a dictionary database and to generate Unified Diagnostic Services (UDS) operation transactions; convert high-level language diagnostic sequence commands into imperative language instructions; compile the imperative language instructions into binary code corresponding to handling routines; segment a binary image of the target ECU into a plurality of data blocks; compile the plurality of data blocks and respective the UDS operation transactions to provide a plurality of UDS stages; assemble the plurality of UDS stages and the handling routines into the reprogramming file; and store the reprogramming file in the memory for transmission to the target vehicle.

In an embodiment of a system, the high-level language diagnostic instructions are generated utilizing a standardized specification language editor comprising Open Test sequence data eXchange (OTX).

In an embodiment of a system, the reprogramming file comprises a header comprising general parameters, general execution conditions, and the number of the plurality of UDS stages.

In an embodiment of a system, the imperative language instructions comprise C language instructions.

In an embodiment of a system, the reprogramming file may comprise a header comprising general parameters, general execution conditions, and the number of the plurality of UDS stages.

In an embodiment of a system, the reprogramming file may comprise steps to create a re-flashing scenario for reprogramming the target ECU, steps to control the reprogramming, and steps to send the reprogramming data to the target ECU. The reprogramming file may further comprise steps to verify success of said reprogramming on a block-by-block basis, and steps to initiate error handling operations.

An embodiment of a system for reprogramming of a target Electronic Control Unit (ECU) disposed within a target vehicle, the system comprises a server and one or more processors. The one or more processors are operable to: access a reprogramming sequence file comprising an Open Test sequence data eXchange (OTX) script file of high-level language diagnostic sequence commands and a data file comprising a dictionary database and vehicle descriptive data comprising a binary image of each vehicle ECU central processing unit (CPU) memory; extract commands from said OTX script file and high-to-low level command conversions specific for the target ECU from the dictionary database to generate Unified Diagnostic Services (UDS) operation transactions; convert the high-level language diagnostic sequence commands into imperative language instructions; compile the imperative language instructions into binary code corresponding to handling routines; segment the binary image into a plurality of data blocks; compile the plurality of data blocks and respective the UDS operation transactions to provide a plurality of UDS stages; and assemble the plurality of UDS stages and the handling routines into a reprogramming file for reprogramming the target ECU. The server is operable to access the target vehicle and transmit the reprogramming file to the target vehicle.

In an embodiment of a system for reprogramming of a target Electronic Control Unit (ECU) the imperative language instructions comprise C language instructions.

In an embodiment of a system for reprogramming of a target Electronic Control Unit (ECU), the reprogramming file may comprise a header comprising general parameters, general execution conditions, and the number of the plurality of UDS stages.

In an embodiment of a system for reprogramming of a target Electronic Control Unit (ECU), the reprogramming file may comprise a plurality of steps to create a re-flashing scenario for reprogramming the target ECU, steps to control the reprogramming, and steps to send the reprogramming data to the target ECU. The reprogramming file may further comprise steps to verify success of said reprogramming on a block-by-block basis, and steps to initiate error handling operations.

In an embodiment of a system for reprogramming of a target Electronic Control Unit (ECU), at least some stages of the plurality of stages are arranged to each comprise a corresponding one block of binary data for reflashing a corresponding block of a flash memory of the target ECU.

In an embodiment of a system for reprogramming of a target Electronic Control Unit (ECU), the target vehicle comprises an electronic module comprising a processor and an associated memory; the target vehicle stores the reprogramming file in the electronic module associated memory; and the electronic module processor executes the reprogramming file on a stage-by-stage basis to reflash the flash memory on a block-by-block basis.

An embodiment of a system for reprogramming of a target Electronic Control Unit (ECU) disposed within a target vehicle by reflashing a memory of the ECU comprises a server, a memory, and one or more processors operable to access a reprogramming sequence file comprising an Open Test sequence data eXchange script of high-level language diagnostic sequence commands and a data file comprising a dictionary database and vehicle descriptive data comprising a binary image of each vehicle ECU central processing unit (CPU) memory. The one or more processors extract high-to-low level command conversions specific for the target ECU from the dictionary database to generate Unified Diagnostic Services (UDS) operation transactions, convert the high-level language diagnostic sequence commands into imperative language instructions, compile the imperative language instructions into binary code corresponding to handling routines, segment the binary image into a plurality of data blocks, compile the plurality of data blocks and respective the UDS operation transactions to provide a plurality of UDS stages, and assemble the plurality of UDS stages and the handling routines into a reprogramming file for reprogramming the target ECU. The reprogramming file is stored in the memory. The server operates to access the reprogramming file and transmit the reprogramming file to the target vehicle.

In an embodiment of a system for reprogramming of a target Electronic Control Unit (ECU) the imperative level language instructions comprise C language instructions.

In an embodiment of a system for reprogramming of a target Electronic Control Unit (ECU), the reprogramming file may comprise a header comprising general parameters, general execution conditions, and the number of the plurality of UDS stages.

In an embodiment of a system for reprogramming of a target Electronic Control Unit (ECU), the reprogramming file comprises a plurality of steps to create a re-flashing scenario for reprogramming the target ECU, steps to control the reprogramming, and steps to send the reprogramming data to the target ECU.

In an embodiment of a system for reprogramming of a target Electronic Control Unit (ECU), the one or more processors form at least some stages of the plurality of stages to each comprise a corresponding one block of binary data for reflashing a corresponding block of a flash memory of the target ECU.

In an embodiment of a system for reprogramming of a target Electronic Control Unit (ECU), the reprogramming file may be executed by the target vehicle on a stage-by-stage basis to reflash the flash memory on a data block by data block basis.

In an embodiment of a system for reprogramming of a target Electronic Control Unit (ECU), the server transmits the reprogramming file to the target vehicle via a wireless link.

In an embodiment of a system for reprogramming of a target Electronic Control Unit (ECU), the vehicle may comprise an electronic module comprising a memory and a processor, the vehicle stores the reprogramming file in the electronic module memory, and the electronic module executes the reprogramming file on a stage-by-stage basis to reflash the flash memory on a data block by data block basis.

In an embodiment of a system for reprogramming of a target Electronic Control Unit (ECU), the vehicle comprises an electronic module comprising a memory and a processor, the vehicle stores the reprogramming file in the electronic module memory, and the electronic module executes the reprogramming file on a stage-by-stage basis to reflash the flash memory on a data block by data block basis.

An embodiment of a method for generating a reprogramming file for reprogramming a target electronic control unit (ECU) in a target vehicle comprises: providing access to a first file comprising high level language instructions in a standardized specification language for reprogramming the target ECU; providing access to vehicle data for a plurality of vehicles and to a plurality of binary memory images and respective mapping of a corresponding plurality of ECU memories of each vehicle of the plurality of vehicles; providing access to a dictionary database to convert high-level language commands to Unified Diagnostic Services (UDS) operation transactions; utilizing high-to-low level command conversions specific for the target ECU from the dictionary database to generate Unified Diagnostic Services (UDS) operation transactions from the high-level language commands; converting high-level language diagnostic sequence commands into imperative language instructions; compiling the imperative language instructions into binary code corresponding to handling routines; segmenting a binary image of the target ECU into a plurality of data blocks; compiling the plurality of data blocks and respective the UDS operation transactions to provide a plurality of UDS stages, each stage of the plurality of stages comprises one corresponding data block or the plurality of data blocks; and assembling the plurality of UDS stages and the handling routines into the reprogramming file.

In an embodiment of the method, the high-level language diagnostic instructions are generated utilizing a standardized specification language editor comprising Open Test sequence data eXchange (OTX).

In an embodiment of the method, the method may comprise assembling the reprogramming file to comprise a header portion comprising general parameters, general execution conditions, and the number of the plurality of UDS stages.

In an embodiment of the method, the reprogramming file comprises steps to create a re-flashing scenario for reprogramming the target ECU, steps to control the reprogramming, and steps to send the reprogramming data to the target ECU. The reprogramming file may comprise steps to verify success of the reprogramming on a block-by-block basis, and steps to initiate error handling operations.

An embodiment of a method for reprogramming of a target Electronic Control Unit (ECU) disposed within a target vehicle comprises: accessing a reprogramming sequence file comprising an Open Test sequence data eXchange (OTX) script of high-level language diagnostic sequence commands and a data file comprising a dictionary database and vehicle descriptive data comprising a binary image of the memory of the target ECU; extracting high-to-low level command conversions specific for the target ECU from the dictionary database to generate Unified Diagnostic Services (UDS) operation transactions; converting the high-level language diagnostic sequence commands into C language instructions; compiling the C language instructions into binary code corresponding to handling routines; segmenting the binary image for the target ECU memory into a plurality of memory reflashing data blocks; compiling the plurality of memory reflashing data blocks and respective the UDS operation transactions to provide a plurality of UDS stages; and assembling the plurality of UDS stages and the handling routines into a reprogramming file for reprogramming the target ECU.

In an embodiment of the method, the imperative language instructions comprise C language instructions.

In an embodiment of the method, the method comprises assembling the reprogramming file to comprise a header portion comprising general parameters, general execution conditions, and the number of the plurality of UDS stages.

In an embodiment of the method, the reprogramming file comprises a plurality of steps to create a re-flashing scenario for reprogramming the target ECU, steps to control the reprogramming, and steps to send the reprogramming data to the target ECU. The reprogramming file may further comprise steps to verify success of the reprogramming on a block-by-block basis, and steps to initiate error handling operations.

In an embodiment of the method, the method comprises arranging at least some stages of the plurality of stages are to each comprise a corresponding one block of binary data for reflashing a corresponding block of the target ECU memory.

In an embodiment of the method, wherein the target vehicle comprises an electronic module comprising a processor and an associated memory, the method may comprise: transmitting the reprogramming file to the vehicle; storing the reprogramming file in the associated memory; and utilizing the electronic module processor to execute the reprogramming file on a stage-by-stage basis to reflash the ECU memory on a block-by-block basis.

An embodiment of a method for reprogramming a target Electronic Control Unit (ECU) disposed within a target vehicle by reflashing a memory of the ECU is provided. The method comprises: accessing a reprogramming sequence file comprising an Open Test sequence data eXchange script of high-level language diagnostic sequence commands; accessing a data file comprising a dictionary database, vehicle descriptive data, and a binary image of the memory of the target ECU; extracting high-to-low level command conversions specific for the target ECU from the dictionary database to generate Unified Diagnostic Services (UDS) operation transactions; converting the high-level language diagnostic sequence commands into imperative language instructions; compiling the imperative language instructions into binary code corresponding to handling routines; extracting the binary image; segmenting the binary image into a plurality of data blocks; compiling the plurality of data blocks and respective the UDS operation transactions to provide a plurality of UDS stages; assembling the plurality of UDS stages and the handling routines into a reprogramming file for reprogramming the target ECU; transmitting the reprogramming file to the target vehicle.

In an embodiment of the method, the imperative language instructions comprise C language instructions.

In an embodiment of the method, the reprogramming file may comprise a header portion comprising general parameters, general execution conditions, and the number of the plurality of UDS stages.

In an embodiment of the method, the handling routines may comprise a plurality of steps to create a re-flashing scenario for reprogramming the target ECU, steps to control the reprogramming, and steps to send the reprogramming data to the target ECU. The reprogramming file may further comprise steps to verify success of the reprogramming on a block-by-block basis, and steps to initiate error handling operations.

In an embodiment of the method, the method may comprise forming at least some stages of the plurality of stages to each comprise a corresponding one the data block of the plurality of data blocks for reflashing a corresponding block of the memory of the target ECU.

In an embodiment of the method, the method may comprise executing the reprogramming file by the target vehicle on a stage-by-stage basis to reflash the memory of the target ECU on a data block by data block basis.

In an embodiment of the method, the method may comprise transmitting the reprogramming file to the target vehicle via a wireless link.

In an embodiment of the method, wherein the vehicle comprises an electronic module comprising a memory and a processor, the method may comprise: storing the reprogramming file in the electronic module memory; and utilizing the electronic module to execute the reprogramming file on a stage-by-stage basis to reflash flash memory of the target ECU on a data block by data block basis.

An embodiment of a non-transitory computer readable medium with computer executable instructions stored thereon as a reprogramming file executed by a processor in a vehicle to provide a reprogramming method for reprogramming a target electronic module in a target vehicle is provided. The reprogramming file comprises a first portion and a plurality of second portions. The first portion comprises general parameters, general execution conditions, and identification of the number of the second portions. Each second portion comprises high-level language diagnostic sequence commands specific for the target electronic module converted into imperative programming language instructions and compiled into binary code corresponding to handling routines and a data block comprising a corresponding one segmented binary image of a plurality of segmented binary images. The plurality of segmented binary images collectively comprises the binary image of the target electronic module. The method comprises the steps of: identifying the target electronic module; determining that the general conditions are present; executing the binary code corresponding to handling routines on a stage-by-stage basis to reprogram the target electronic module by replacing the binary image of the program memory of the target electronic module with the data blocks on a corresponding block-byblock basis; determining the number of the stages included in the reprogramming file; and terminating the reprogramming of the target electronic module when all of the stages have been executed.

In an embodiment of a non-transitory computer readable medium, the high level language diagnostic instructions are generated utilizing a standardized specification language editor comprising Open Test sequence data eXchange (OTX).

In an embodiment of a non-transitory computer readable medium, the non-transitory computer readable medium is associated with a specific processor resident in the vehicle.

In an embodiment of a non-transitory computer readable medium, the reprogramming file is received from a source external to the vehicle and stored in the non-transitory computer readable medium.

In an embodiment of a non-transitory computer readable medium, the imperative programming language instructions comprise C language instructions.

In an embodiment of a non-transitory computer readable medium, the target electronic module comprises a target Electronic Control Unit (ECU).

An embodiment of a computer program product for providing a method of generating a reprogramming program for a target Electronic Control Unit (ECU) disposed within a target vehicle is provided. The computer program product comprises a non-transitory computer-readable medium encoded with computer executable instructions that when executed by a processor executes a method for providing the reprogramming program. The method comprises: accessing a reprogramming sequence file comprising an Open Test sequence data eXchange (OTX) script of high-level language diagnostic sequence commands and a data file comprising a dictionary database and vehicle descriptive data comprising a binary image of the memory of the target ECU; extracting high-to-low level command conversions specific for the target ECU from the dictionary database to generate Unified Diagnostic Services (UDS) operation transactions; converting the high-level language diagnostic sequence commands into imperative language instructions; compiling the imperative language instructions into binary code corresponding to handling routines; segmenting the binary image into a plurality of data blocks; compiling the plurality of data blocks and respective the UDS operation transactions to provide a plurality of UDS stages; and assembling the plurality of UDS stages and the handling routines into a reprogramming file.

In an embodiment of a computer program product, the method may further comprise forming the reprogramming package to comprise a plurality of the stages, each of the stages comprising a Unified Diagnostic Services (UDS) operation.

In an embodiment of a computer program product, the imperative language instructions comprise C language instructions.

In an embodiment of a computer program product, the reprogramming file may comprise a header comprising general parameters, general execution conditions, and the number of the plurality of UDS stages.

In an embodiment of a computer program product, the method may comprise providing the reprogramming file with a plurality of steps to create a re-flashing scenario for reprogramming the target ECU, steps to control the reprogramming, and steps to send the reprogramming data to the target ECU. The reprogramming file may further comprise steps to verify success of the reprogramming on a block-by-block basis, and steps to initiate error handling operations.

In an embodiment of a computer program product, the method may comprise forming the reprogramming package to comprise a plurality of the stages, the plurality of stages comprising a plurality of Unified Diagnostic Services (UDS) operations; and forming the reprogramming file to comprise a first portion comprising general parameters, general execution conditions, and the number of stages of the plurality of stages.

In an embodiment of a computer program product, the method may comprise forming at least some stages of the plurality of stages as each comprising a block of binary data for reflashing a corresponding block of a flash memory of the ECU.

In an embodiment of a computer program product, the method may comprise arranging the reprogramming file to be executed on a stage-by-stage basis to reflash the flash memory on a block-by-block basis.

A further embodiment of a computer program product for providing a method of reprogramming a target Electronic Control Unit (ECU) disposed within a target vehicle is provided. The computer program product comprises a non-transitory computer-readable medium encoded with a reprogramming file comprising computer executable instructions and computer readable data that when executed by a processor disposed within the target vehicle executes the method. The method comprises: accessing a first portion of the reprogramming file, the first portion comprising general parameters, reprogramming execution conditions, and the number of stages of a plurality of reprogramming stages; utilizing the general parameters to identify the target ECU; accessing on a stage-by-stage basis each stage of a plurality of stages of the reprogramming file, each stage comprising a Unified Diagnostic Services (UDS) operation transaction. Each stage is generated by: accessing a reprogramming sequence file comprising an Open Test sequence data eXchange (OTX) script file of high-level language diagnostic sequence commands and a data file comprising a dictionary database and vehicle descriptive data comprising a binary image of the target vehicle ECU memory; extracting commands from said OTX script file and high-to-low level command conversions specific for the target ECU from the dictionary database to generate the UDS operation transactions; converting the high-level language diagnostic sequence commands into C language instructions; compiling the C language instructions into binary code corresponding to handling routines; segmenting the binary image into a plurality of data blocks; and compiling the plurality of data blocks and respective the UDS operation transactions to provide the plurality of UDS stages. The method further comprises executing each stage of the plurality of stages on a stage-by-stage basis to reprogram the target ECU memory on a corresponding block-by-block basis.

In an embodiment of a computer program product, the imperative language instructions comprise C language instructions In an embodiment of a computer program product, the plurality of stages comprises a plurality of steps to create a re-flashing scenario for reprogramming the target ECU memory with the plurality of data blocks, steps to control the reprogramming, and steps to send the plurality of data blocks to the target ECU. The reprogramming file may further comprise steps to verify success of the reprogramming on a block-by-block basis, and steps to initiate error handling operations.

In an embodiment of a computer program product, at least some stages of the plurality of stages each comprise a block of binary data for reflashing a corresponding block of the ECU memory.

DESCRIPTION OF THE DRAWING

The invention will be better understood by a reading of the following detailed description of embodiments of the invention in which like reference indicators designate like elements and in which.

DETAILED DESCRIPTION

Embodiments of the invention are described that provide for reprogramming electronic modules in vehicles. The various embodiments avoid the need to transmit large OTX/ODX XML files to a vehicle. In addition the embodiments avoid the need to have an XML interpreter in the vehicle gateway.

The various embodiments of the system and method do not require LINUX nor any other high level or complex operating system such as utilized in the prior art. The various embodiments may be implemented with a standardized AUTomotive Open System ARchitecture (AUTOSAR) operating system. By utilizing an AUTOSAR operating system, greater security is provided for avoiding cybernetic attacks.

The various embodiments utilize off-line pre-processing of ODX/OTX XML files in order to generate a re-programming file directly executable for a specific microcontroller integrated in the vehicle gateway.

Figure 1:
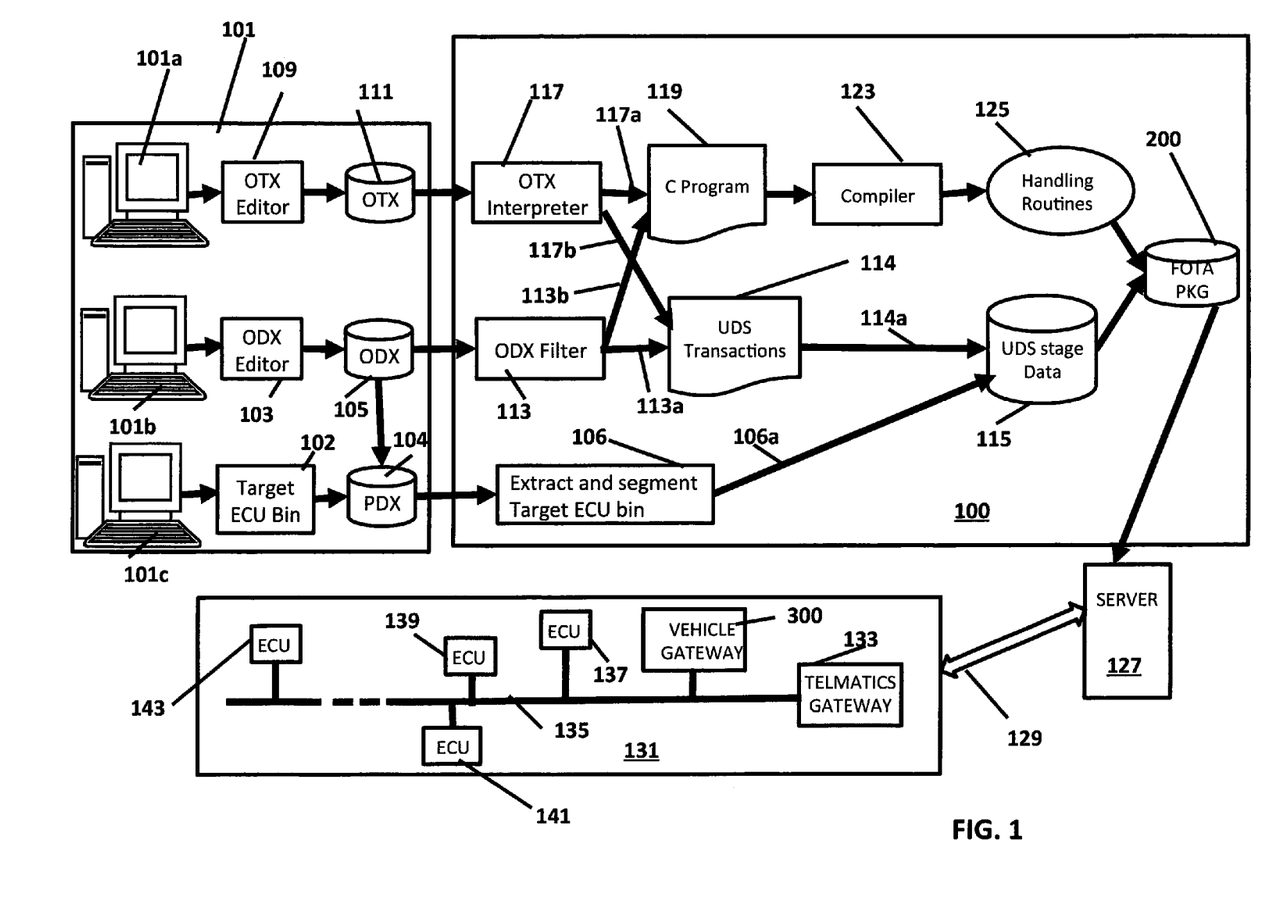
FIG. 1 illustrates an embodiment for reprogramming an ECU.

FIG. 1 illustrates an embodiment of a method and system 100 operable to generate a reprogramming file 200, i.e., a binary file to be transmitted to a target vehicle. In accordance with an aspect of the embodiment offline processing is utilized to generate a reprogramming file 200. Reprogramming file 200 contains both control software and new program(s) to replace the corresponding program(s) in one or more electronic module(s) or electronic control units (ECU) in the vehicle. The control software performs the same functionalities that are performed by XML instructions in a diagnostics tool utilizing OTX/ODX.

In the embodiment of FIG. 1, reprogramming file 200 is transmitted by server 127 to a target vehicle 131 via a wireless link 129. In this instance, the reprogramming file is referred to as a "FOTA package." It will be understood by those skilled in the art that although the various embodiments shown utilize a wireless link to transmit the reprogramming file or FOTA package 200 to the target vehicle, the reprogramming file may be transmitted to a target vehicle by utilizing a hardwire connection to the vehicle as well.

In the embodiment of FIG. 1, a vehicle original equipment manufacturer (OEM) 101 utilizes computers 101a, 101b, 101c to generate XML files and data that are utilized to generate reprogramming file 200.

An OTX editor 109 is utilized to generate high-level language instructions stored in an OTX file 111 for performing reprogramming changes to a target ECU. An ODX editor 103 is utilized to generate an ODX dictionary database 105 to convert high-level language commands to low-level instructions that are specific to the target car. A zip compressed PDX file 104 is generated by combining low-level instructions from ODX database 105 with a binary image of programs in each vehicle ECU memory accessed from the target ECU binary image file 102 along with respective memory mapping.

System 100 has access to OTX file 111 comprising high-level language instructions in a standardized specification language for reprogramming a target ECU.

System 100 also has access to ODX file 105 to provide access to a dictionary database to convert high-level language commands to Unified Diagnostic Services (UDS) operation transactions. UDS is codified in ISO 14229-1: 2013 and allows diagnostics to control functions on an in-vehicle ECU.

System 100 further has access to PDX file 104 providing access to vehicle data for a plurality of vehicles and to a plurality of binary memory images and respective mapping of a target ECU memory of a target vehicle.

OTX file 111 provides a script that in conjunction with the ODX file 105 and PDX file 104 are utilized to flash or reflash a target ECU flash memory. An OTX interpreter 117 is a functional tool that extracts or reads high-level instructions from OTX file 111 and converts the instructions into imperative language instructions, more specifically, C language instructions with support from ODX filter 113 to generate a C language program 119.

C language program 119 is operated on by compiler 123 to convert the C language instructions into machine code for pre-stage handling routines, ACK handling routines, and NACK/Error handling routines, collectively referred to as handling routines 125.

ODX filter 113 accesses ODX file 103 and functions as a tool to extract high level to low level command or instruction conversions for a target ECU and generates UDS transactions for reprogramming the memory of the target ECU from the high-level language command in the OTX file 111.

System 100 accesses PDX file 104 via extract and segment tool 106. Extract and segment tool 106 extracts target car specific and target ECU memory mapping and new data to be updated. Data handling procedures defined in the dictionary OTX file 111, converted with the dictionary ODX and compiled in UDS transactions are set with data blocks to be handled by respective UDS commands to replace corresponding target ECU binary code segments to produce UDS stage data 115.

System 100 combines handling routines 125 and UDS stage data to form reprogramming file or FOTA package 200. FOTA package 200 comprises a plurality of FOTA stages. Each stage may correspond to a Unified Diagnostic Services (UDS) operation.

The FOTA package 200 may be transmitted to a vehicle at a later time.

In the embodiment of FIG. 1, server 127 has access to FOTA package 200 and is operable to selectively transmit the FOTA package to a target vehicle 131 (or vehicles) via a wireless link 129. Wireless link 129 may comprise wireless wide area network or a wireless local area network or a combination of a wireless wide area network and a wireless local area network.

Target vehicle 131 comprises a telematics gateway 133 that receives the FOTA package. Telematics gateway 133 is coupled to a vehicle gateway 300 and transfers the FOTA package to vehicle gateway 300. Typically, vehicle gateway 300 is provided by an infotainment and gateway ECU. In other embodiments, telematics gateway 133 and the infotainment and gateway ECU 300 may be combined. Vehicle gateway 300 is coupled to vehicle bus 135. Various ECUs 137, 139, 141, 143 are coupled to vehicle bus 135. Connection between telematics gateway 133 and vehicle gateway 300 may be done via a separate bus different from vehicle bus 135.

Vehicle gateway 300 comprises a memory that is not shown in FIG. 1. The memory of vehicle gateway 300 stores FOTA package 200. Vehicle gateway 300 utilizes the FOTA package 200 to identify a target ECU, e.g., ECU 143, and to reprogram the target ECU 143.

Advantageously FOTA package 200 is a significantly smaller size than reprogramming packages utilized previously and accordingly less memory for storing FOTA package 200 is required, the transmission of FOTA package takes less time. The result of these advantages is that the vehicle gateway 300 the infotainment and gateway ECU requires less memory size and less processing power.

FOTA package 200 includes steps to create a re-flashing scenario, control the re-flashing process, and send the reflashing data to the target ECU ready to be executed. Vehicle gateway 300 only has to read FOTA package from its memory and execute the orders with minimum pre-processing. In addition, data in FOTA package 200 originating with the OEM has been interpreted, filtered and structured from the OTX file 111, ODX file 105 and PDX file 104 package generated by the OEM. Thus, the memory size required to store the FOTA package is smaller.

Figure 2:
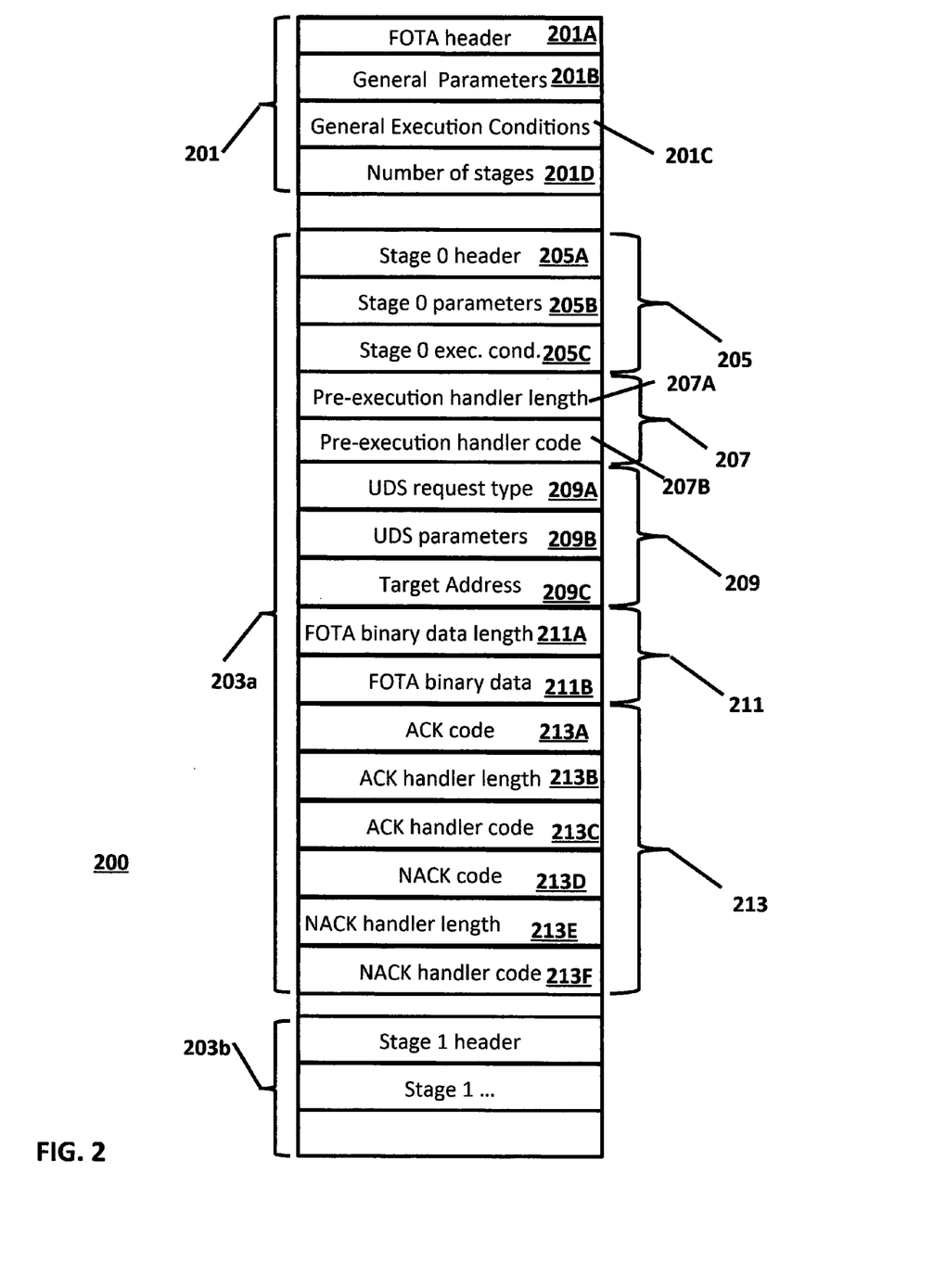
FIG. 2 illustrates an embodiment of a reprogramming file.

Turning now to FIG. 2, the structure of FOTA package 200 is shown. The FOTA package comprises a plurality of stages 203a, 203b and a common header 201. The common header 201 creates the working environment for reprogramming the target ECU and includes a FOTA header 201A, general FOTA parameters 201B, general execution conditions 201C, and the number of FOTA stages 201D included in the FOTA package. FOTA header 201A may typically comprise FOTA identification information such as an upgrade file identifier and an upgrade version. The general FOTA parameters 201B may comprise target ECU identification information. The general execution conditions 201C comprises vehicle state information to define the specific vehicle state during which the FOTA update package may be executed. The number of FOTA stages 201D identifies the size of the FOTA package in terms of FOTA stages.

The common header 201 is followed by the FOTA stages. FIG. 2 shows one complete FOTA stage 203a and a second FOTA stage 203b shown only in abbreviated form. It will be understood by those skilled in the art that although only two FOTA stages 203a, 203b are shown, a typical FOTA package 200 comprises a plurality of stages.

FOTA stage 203a is representative of each stage and comprises, as shown for stage 0: a stage header 205 that is specific for the UDS instruction in the stage and comprising, for example, a stage header 205A, stage parameters 205B, and stage execution conditions 205C.

FOTA stage 203a additionally comprises scenario control stage portion 207 that identifies specific pre-actions, if needed, to ensure correct UDS processing by the target ECU. Scenario control portion 207 in turn comprises the pre-execution handler length 207A and the pre-execution handler code 207B.

Following scenario control 207, the UDS transaction commands 209 for the specific process for the target vehicle is set out with a UDS request type 209A, UDS parameters 209B, and a target address 209C that identifies the target ECU. One UDS transaction command is for "data re-flash."

A binary data portion 211 is provided for the case that there is a "data re-flash." Binary data portion 211 comprises FOTA binary data length 211A that indicates the size of the block and the FOTA binary data 211B to be used to reprogram a block of the target ECU memory.

Still further, stage 203a comprises portion 213 that provides data integrity and stage processing completion to verify good action completion utilizing ACK data or "error-handling" tasks in NACK handler code. Portion 213 comprises an ACK code field 213A, an ACK handler length field 213B, the ACK handler code 213C, NACK code 213D, NACK handler length 213E, and NACK handler code 213F.

Each UDS transaction comprises a request and a response to the request. In embodiment shown each FOTA stage comprises a UDS transaction.

As described herein above, the binary data for a target ECU is segmented offline at system 100 on the server 127 side of wireless link 129 to generate a FOTA package 200. Each FOTA stage can carry a segment or block of the target ECU 143 flash memory. With this approach, runtime RAM usage in vehicle gateway 300 for this process is reduced down to 4 kb or less, and this enables a reduction in total RAM requirement without any performance penalty.

Figure 3:
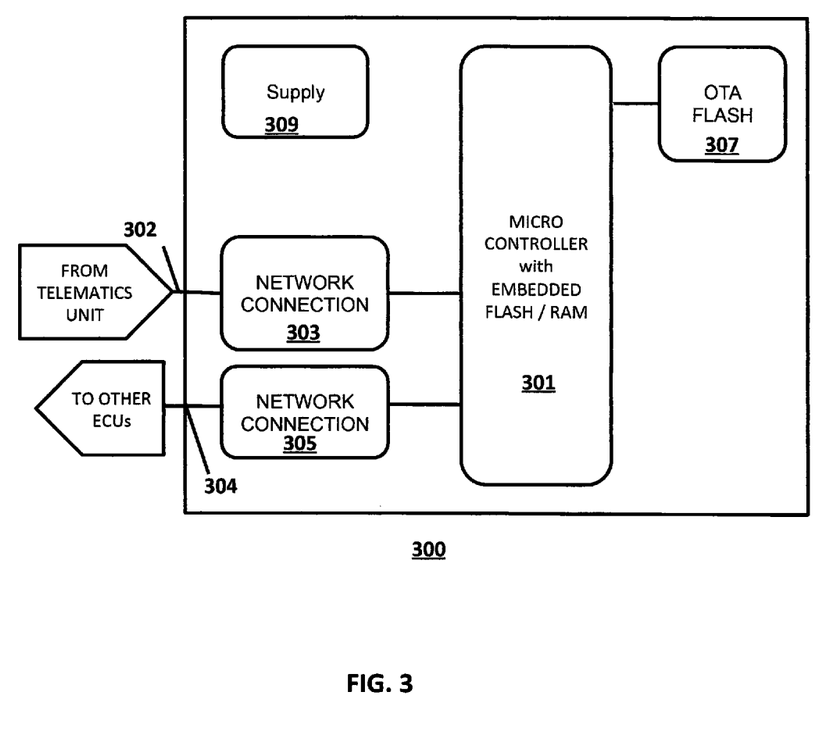
FIG. 3 is a block diagram of an embodiment of a vehicle electronic module.

Turning now to FIG. 3, a representative infotainment/vehicle gateway ECU 300 is shown. Infotainment/vehicle gateway ECU 300 has a network connection 303 via access point 302 to a telematics unit 133 that receives FOTA packages and has a network bus connection 305 via access point 304 to other ECUs. Network bus connections 303, 305 may in various embodiments connect to the same network bus, such as a vehicle CAN bus or an Ethernet bus, or telematics unit 133 may be the same as infotainment/vehicle gateway ECU 300. Infotainment/vehicle gateway ECU 300 comprises a microcontroller 301 with embedded flash memory and RAM memory that is programmed to execute commands and provide responses. Infotainment/vehicle gateway ECU 300 further comprises an OTA flash memory 307 for storing flash data. In various embodiments, flash memory 307 may also be integrated into the embedded memory of microcontroller 301.

With the structure of FOTA package 200, the received data file stored in flash memory 307 may be read block by block into microcontroller 301 RAM, and thus the size of microcontroller 301 RAM may be much smaller than FOTA package 200 stored in flash memory 307. Flash memory 307 may be used for other purposes, apart from storing the FOTA package 200 or multiple FOTA packages 200.

When a FOTA package 200 is received by vehicle gateway 300, microcontroller 301 will read it and read and first execute the information contained in the common header 201 of the FOTA package 200 shown in FIG. 2. Microcontroller 301 utilizes the general parameters and execution conditions to determine whether to proceed or to generate the required commands to set the system into the correct mode or status to enable target ECU reprogramming. If the initial conditions are met, gateway 301 will further progress to execute the UDS request for each FOTA stage 203a, 203b, ... 203n. In this way, microcontroller 300 will perform exactly as a diagnostic tool interpreting the XML files.

Figure 4:
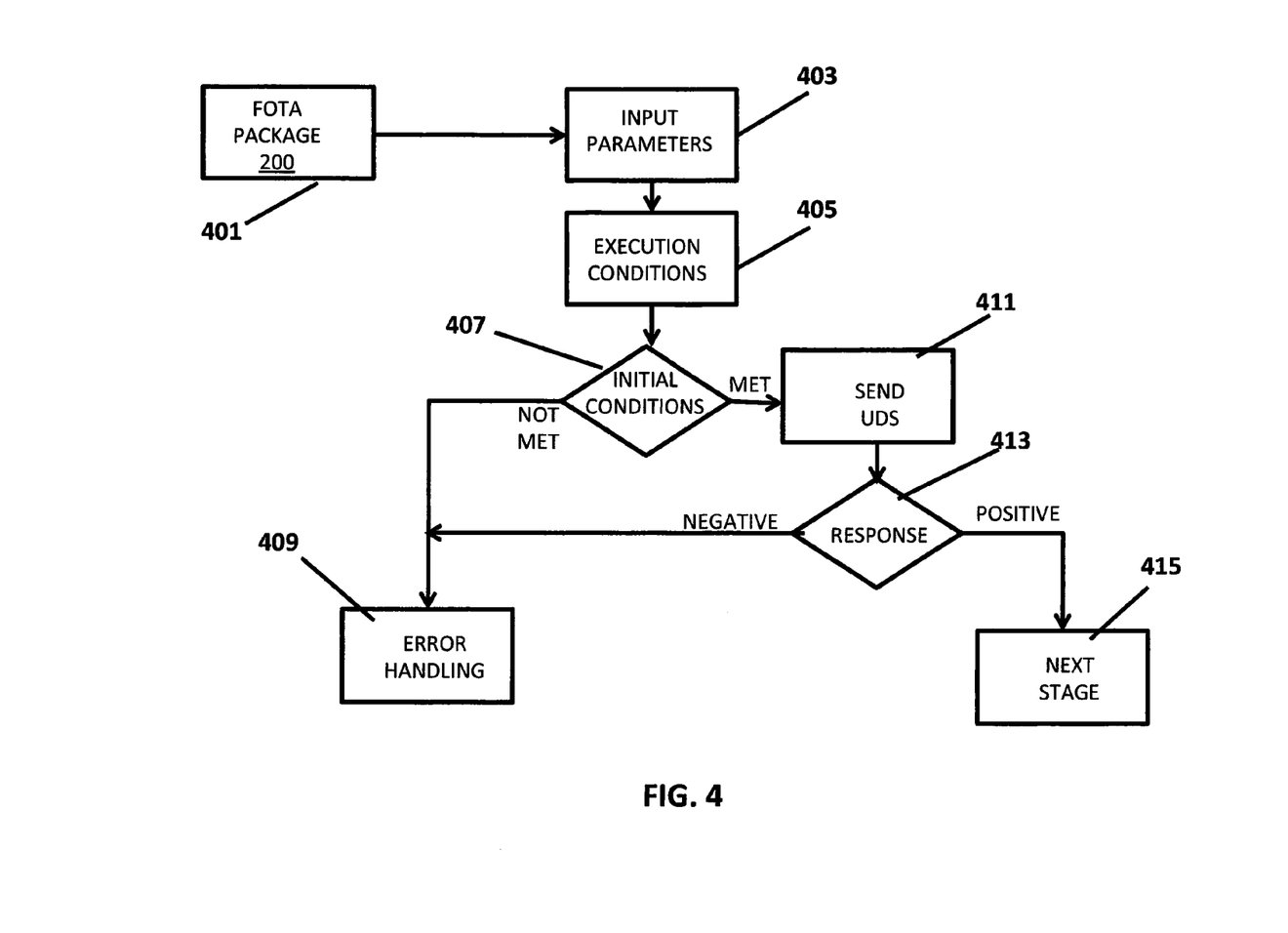
FIG. 4 illustrates the operation of the vehicle electronic module of FIG. 3.

Turning now to FIG. 4, after a FOTA package 200 is received at step 401, microcontroller 301, at step 403, reads the parameters from general parameters section 201B of FOTA package 200 shown in FIG. 2 and sets the general execution conditions 201C at step 405. At step 407, microcontroller 301 determines if the reprogramming execution conditions are met. If the execution conditions are not met, then the reflash operation enters into a defined handling routine for negative or error response at step 409.

If, at step 407 it is determined that the reprogramming execution conditions are met then, at step 411, microcontroller 301 transmits a UDS request type to target ECU 143 and receives a response from target ECU 143. Microcontroller 301 determines if the UDS request is executed at step 413. If the UDS request is not executed, microcontroller 301 will cause the reprogramming to enter the defined handling routine for negative or error response at step 409. If microcontroller 301 determines that the UDS request has been correctly executed to reprogram a block of code in the target ECU flash memory, microcontroller 301 will advance to the next stage at step 415 and return to step 405 to repeat the process until all stages have been correctly executed to reprogram the block of code in the target ECU flash memory whereupon microcontroller 301 will provide a response that the reprogramming is complete.

After a FOTA package 200 is stored in infotainment/vehicle gateway ECU 300; the method for reprogramming comprises first reading input parameters and setting the general execution conditions.

Each stage of FOTA package 200 is an UDS transaction comprising a UDS request to the target ECU and a response from the target ECU. This is repeated for each stage of FOTA package 200.

For each stage of FOTA package 200, the method is structured to optionally execute a handling routine before the UDS request to, for example, check any specific vehicle state variable or execute any stage specific action. The target ECU address is obtained as well as the UDS request type and its parameters to construct and send a UDS request frame to the target ECU. The UDS request may include a segment of the target ECU binary image, i.e., a data block. After receiving a response from the target ECU, an ACK, NACK or error handling routine may be executed. The error handling routine may include timeout error.

In various embodiments, a stage may correspond to any UDS message. The various embodiments are completely flexible to support any diagnostics sequence. For example one of the first stages may correspond to an UDS request to shift the target ECU to a programming mode and the following stages may include UDS requests for the data transfer. Also, for example, some other stages could be included for reading the diagnostic trouble codes (DTCs) of the target ECU and executing diagnostic routines. The diagnostic sequence is fully specified by the OEM in the OTX and ODX files and the FOTA package is structured to behave exactly the same.

Figure 5:
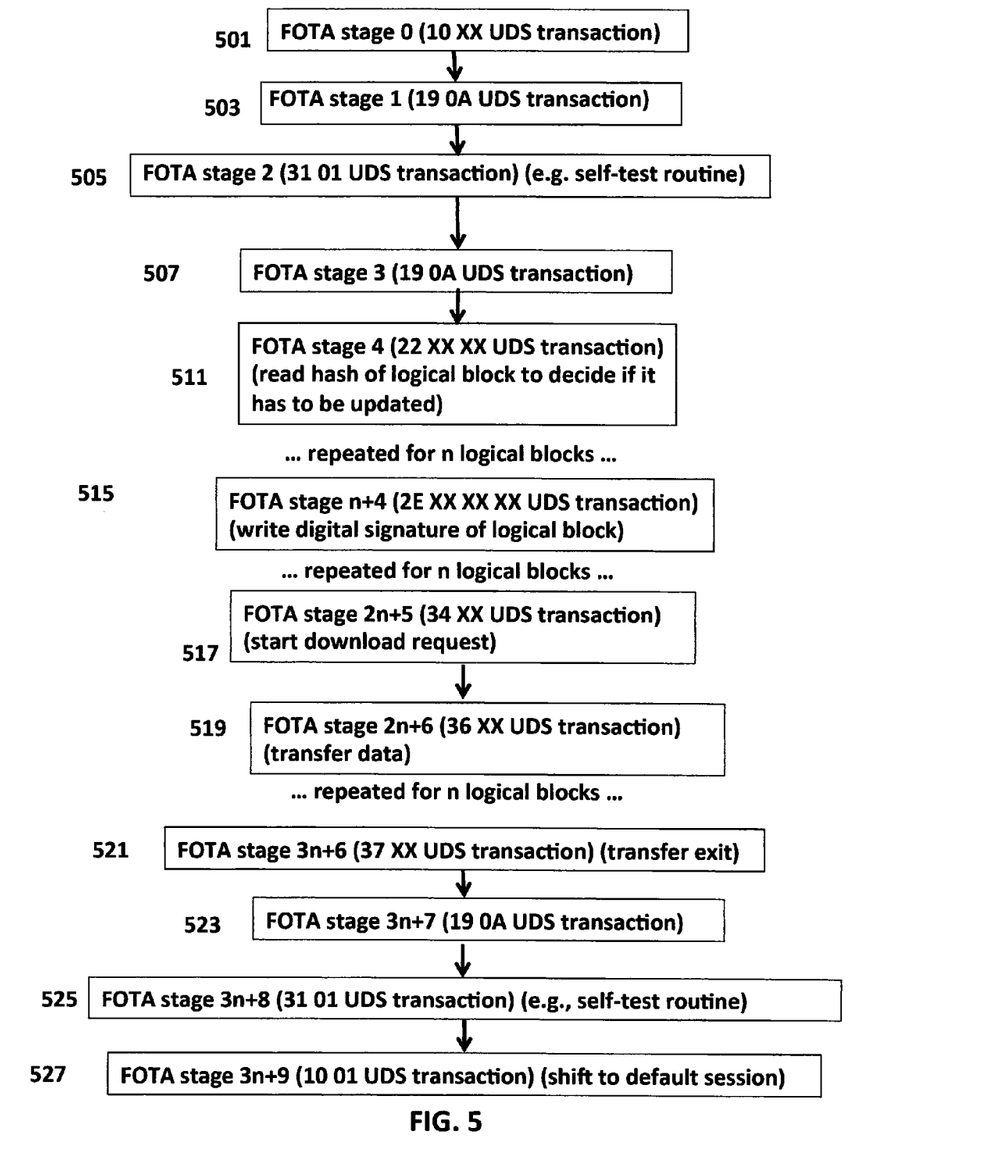
FIG. 5 illustrates an example of the reprogramming file of FIG. 2 executable stage-by-stage.

FIG. 5 illustrates a flowchart of an example of FOTA package 200. The FOTA package comprises 3n+9 stages each with a single UDS command. In this embodiment, stage 0 501 through stage 2n+5 517 comprise UDS transactions that are not specific re-flash data commands. It is only from stage 2n+6 519 and on that the UDS code "36" that is the UDS specific re-flash data command is found.

Each FOTA stage utilizes standardized UDS diagnostic services message services. Each of the stages, 501 ... 527 is a UDS transaction. As shown in FIG. 5, each stage utilizes UDS Service Identifiers (SID).

Figure 6:
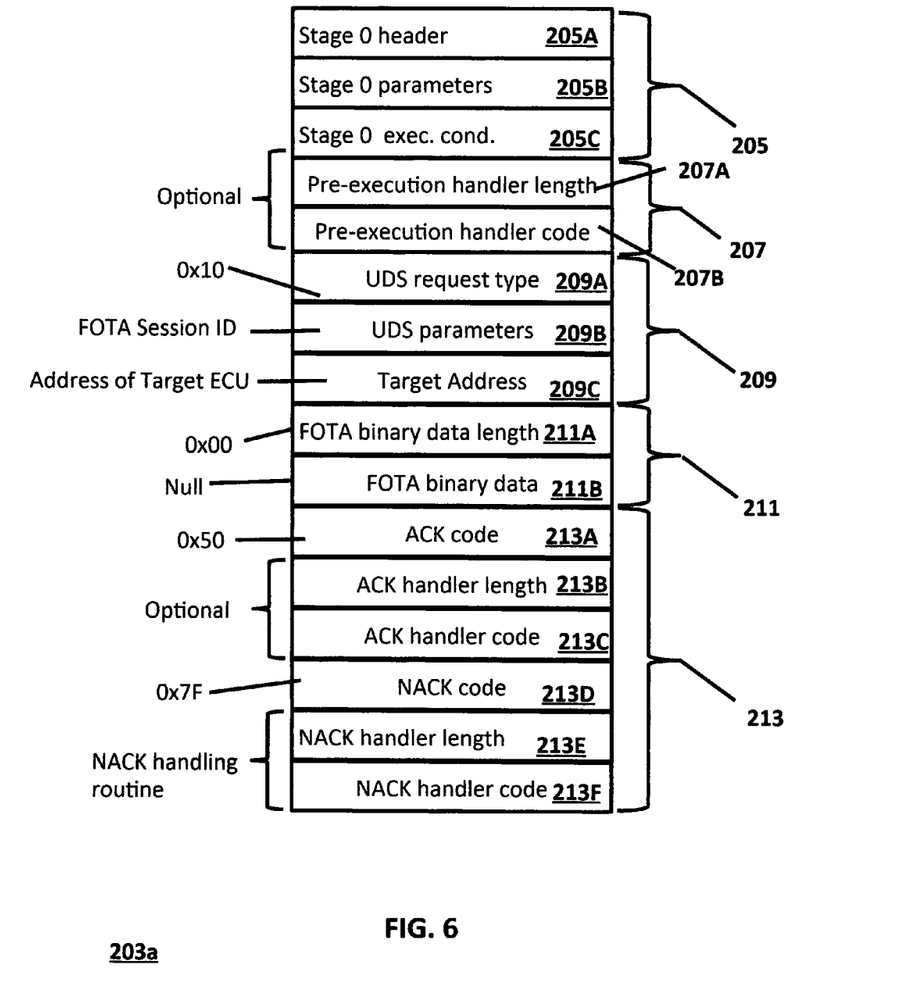
FIGS. 6, 7, and 8 each illustrate in greater detail stages of the reprogramming file of FIG. 2.
Figure 7:
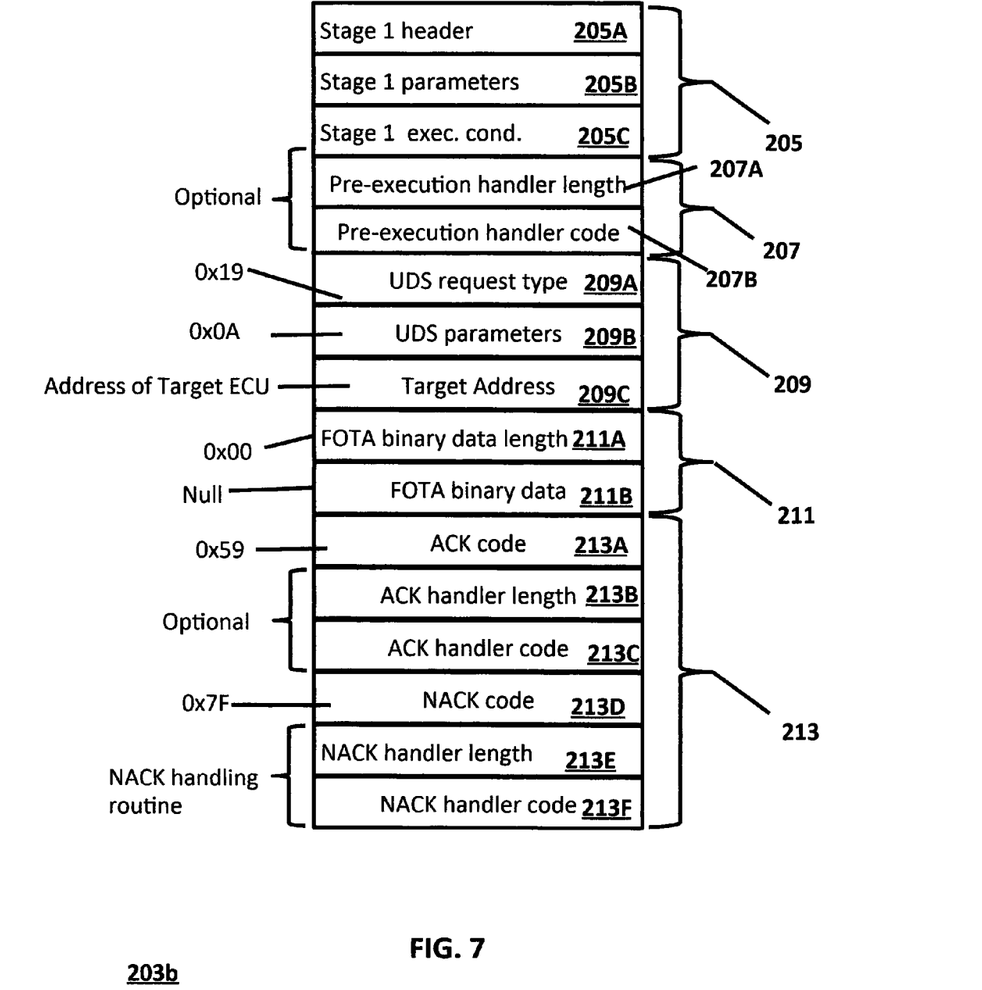
Figure 8:
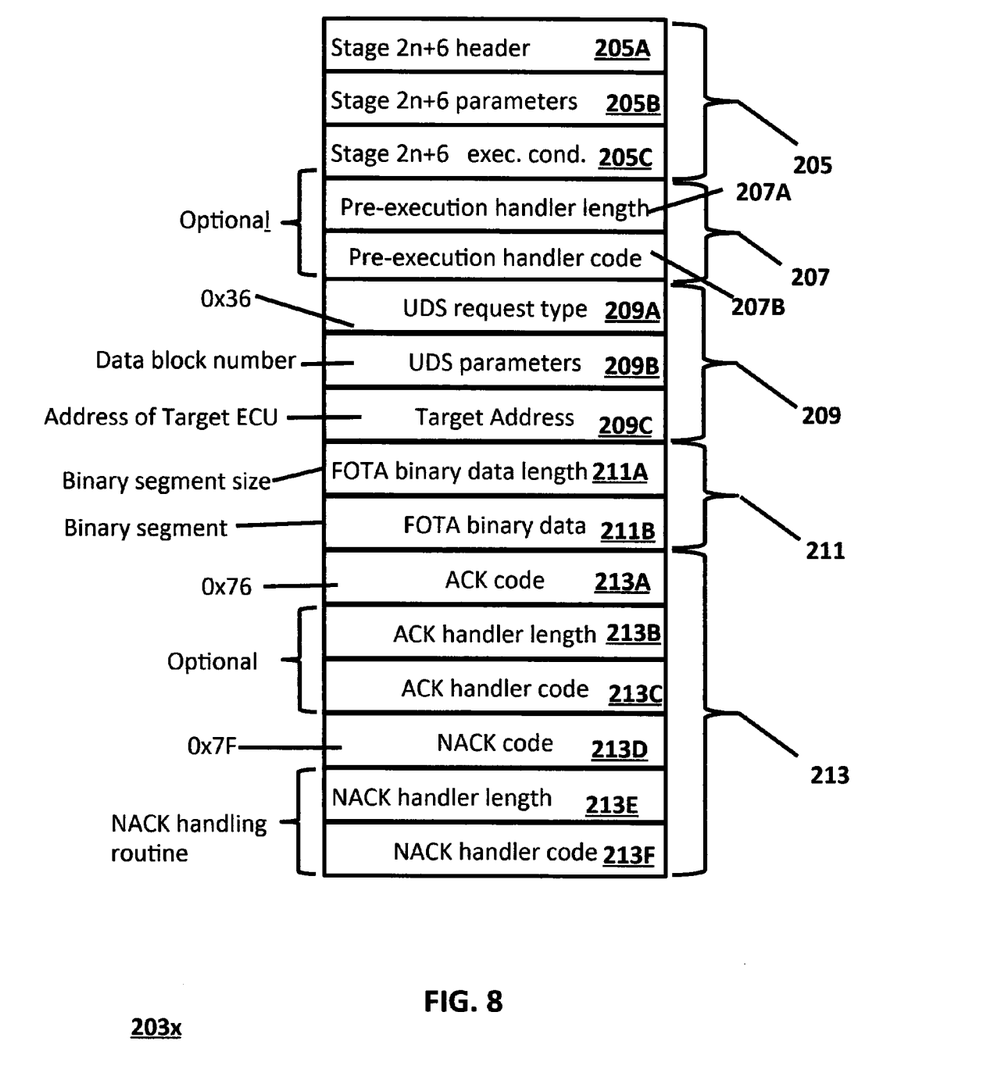

FIGS. 6, 7, and 8 show detailed examples of selected stages in the flowchart of FIG. 5. FIG. 6 illustrates stage 0 501. FIG. 7 illustrates stage 1 503. FIG. 8 illustrates stage 2n+6 519.

Stage 0 203a, shown in FIG. 6, comprises a SID request 10 to initiate a UDS transaction that is a session shift for a data transfer. SID 10 is a Diagnostic and Communications Management service and more specifically, a Diagnostic Session Control. UDS uses different operating sessions that can be changed utilizing the Diagnostic Session Control. In this instance FOTA stage 0 is a reprogramming shift.

Stage 1 203b, shown in FIG. 7, reads the DTCs of a target ECU to verify that no relevant anomalies are present. Self-checking is performed on every logical block of code. Verification is made that self-checking is completed and there is no memory failure and there is sufficient margin of available memory for the remaining count or the entire block.

Stage 2n+6 203x, shown in FIG. 8, provides for re-flashing one memory block of the target ECU. The UDS request type field 209A comprises a data re-flashing command and FOTA binary data field 211B comprises the data to re-flash the target ECU.

The invention has been described in terms of various embodiments. It will be apparent to those skilled in the art that various modifications may be made without departing from the scope of the invention. It will be further apparent to those skilled in the art that the term "re-flash" in the above description and in the claims is synonymous with "re-write" and "re-program" and the term "re-flashing" is synonymous with "re-writing" and "re-programming". Although the embodiments are described in terms of "flash memory", it will be understood by those skilled in the art that the scope of the invention includes "writeable non-volatile memory" as well. It is intended that the invention not be limited to the embodiments shown and described. It is intended that the scope of the invention be limited only by the scope of the claims appended hereto.

What is claimed is:

1. A method for generating a reprogramming file for reprogramming a target electronic control unit (ECU) in a target vehicle, said method comprising:

providing access to a first file comprising high level language commands in a standardized specification language for reprogramming said target ECU, said high level language commands are generated utilizing a standardized specification language editor comprising Open Test sequence data eXchange (OTX);

providing access to vehicle data for a plurality of vehicles and to a plurality of binary memory images and respective mapping of a corresponding plurality of ECU memories of each vehicle of said plurality of vehicles;

providing access to a dictionary database to convert high-level language commands-to Unified Diagnostic Services (UDS) operation transactions;

utilizing high-to-low level command conversions specific for said target ECU from said dictionary database to generate Unified Diagnostic Services (UDS) operation transactions from said high-level language commands;

converting high-level language diagnostic sequence commands into imperative language instructions;

compiling said imperative language instructions into binary code corresponding to handling routines;

segmenting a binary image of said target ECU into a plurality of data blocks;

compiling said plurality of data blocks and respective said UDS operation transactions to provide a plurality of UDS stages, each stage of said plurality of stages comprises one corresponding data block of said plurality of data blocks;

assembling said plurality of UDS stages and said handling routines into said reprogramming file.

2. The method of claim 1, comprising:

assembling said reprogramming file to comprise a header portion comprising general parameters, general execution conditions, and the number of said plurality of UDS stages.

3. The method of claim 1, wherein:

said reprogramming file comprises:
   steps to create a reprogramming scenario for reprogramming said target ECU;
   steps to control said reprogramming; and
   steps to send said reprogramming data to said target ECU.

4. The method of claim 3, wherein:

said reprogramming file comprises:
   steps to verify success of said reprogramming on a block-by-block basis; and
   steps to initiate error handling operations.

5. A method for reprogramming of a target Electronic Control Unit (ECU) disposed within a target vehicle, said method comprises:

accessing a reprogramming sequence file comprising an Open Test sequence data eXchange (OTX) script of high-level language diagnostic sequence commands and a data file comprising a dictionary database and vehicle descriptive data comprising a binary image of the memory of said target ECU;

extracting high-to-low level command conversions specific for said target ECU from said dictionary database to generate Unified Diagnostic Services (UDS) operation transactions;

converting said high-level language diagnostic sequence commands into imperative language instructions;

compiling said imperative language instructions into binary code corresponding to handling routines;

segmenting said binary code for said target ECU memory into a plurality of memory reflashing data blocks;

compiling said plurality of memory reflashing data blocks and respective said UDS operation transactions to provide a plurality of UDS stages; and assembling said plurality of UDS stages and said handling routines into a reprogramming file for reprogramming said target ECU.

6. The method of claim 5, wherein:

said imperative language instructions comprise C language instructions.

7. The method of claim 5, comprising:

assembling said reprogramming file to comprise a header portion comprising general parameters, general execution conditions, and the number of said plurality of UDS stages.

8. The method of claim 7, wherein:

said reprogramming file comprises:
   a plurality of steps to create a reprogramming scenario for reprogramming said target ECU;
   steps to control said reprogramming; and
   steps to send said reprogramming data to said target ECU.

9. The method of claim 8, wherein:

said reprogramming file comprises:
   steps to verify success of said reprogramming on a block-by-block basis; and
   steps to initiate error handling operations.

10. The method of claim 5, comprising:

arranging at least some stages of said plurality of stages are to each comprise a corresponding one block of binary data for reprogramming a corresponding block of said target ECU memory.

11. The method of claim 10, wherein said target vehicle comprises an electronic module comprising a processor and an associated memory, said method comprising:

transmitting said reprogramming file to said vehicle;

storing said reprogramming file in said associated memory; and utilizing said electronic module processor to execute said reprogramming file on a stage-by-stage basis to reprogram said ECU memory on a block-by-block basis.

12. A method for reprogramming of a target Electronic Control Unit (ECU) disposed within a target vehicle by reflashing a memory of said ECU, said method comprising:

accessing a reprogramming sequence file comprising an Open Test sequence data eXchange (OTX) script of high-level language diagnostic sequence commands;

accessing a data file comprising a dictionary database, vehicle descriptive data, and a binary image of said memory of said target ECU;

extracting high-to-low level command conversions specific for said target ECU from said dictionary database to generate Unified Diagnostic Services (UDS) operation transactions;

converting said high-level language diagnostic sequence commands into imperative language instructions;

compiling said imperative language instructions into binary code corresponding to handling routines;

extracting said binary image;

segmenting said binary image into a plurality of data blocks;

compiling said plurality of data blocks and respective said UDS operation transactions to provide a plurality of UDS stages;

assembling said plurality of UDS stages and said handling routines into a reprogramming file for reprogramming said target ECU; and transmitting said reprogramming file to said target vehicle.

13. The method of claim 12, wherein:

said imperative language instructions comprise C language instructions.

14. The method of claim 12, wherein:

said reprogramming file comprises a header portion comprising general parameters, general execution conditions, and the number of said plurality of UDS stages.

15. The method of claim 12, wherein:

said handling routines comprises:
   a plurality of steps to create a reprogramming scenario for reprogramming said target ECU;
   steps to control said reprogramming; and
   steps to send said reprogramming data to said target ECU.

16. The method of claim 15, wherein:

said handling routines comprise:
   steps to verify success of said reprogramming on a block-by-block basis; and
   steps to initiate error handling operations.

17. The method of claim 12, comprising:

forming at least some stages of said plurality of stages to each comprise a corresponding one said data block of said plurality of data blocks for reprogramming a corresponding block of said memory of said target ECU.

18. The method of claim 12, wherein:

executing said reprogramming file by said target vehicle on a stage-by-stage basis to reprogram said memory of said target ECU on a data block by data block basis.

19. The method of claim 12, comprising:

transmitting said reprogramming file to said target vehicle via a wireless link.

20. The method of claim 19, wherein said vehicle comprises an electronic module comprising a memory and a processor, and said method comprises:

storing said reprogramming file in said electronic module memory; and utilizing said electronic module to execute said reprogramming file on a stage-by-stage basis to reprogram memory of said target ECU on a data block by data block basis.

21. The method of claim 12, wherein said vehicle comprises an electronic module comprising a memory and a processor, and said method comprises:

storing said reprogramming file in said electronic module memory; and utilizing said electronic module to execute said reprogramming file on a stage-by-stage basis to reprogram said memory of said target ECU on a data block by data block basis.

* * * * *

UNITED STATES PATENT AND TRADEMARK OFFICE
CERTIFICATE OF CORRECTION

PATENT NO. : 10,031,740 B2
APPLICATION NO. : 15/420349
DATED : July 24, 2018
INVENTOR(S) : Ricardo Martinez Elizalde, Ronald W Pashby and Antoni Ferre Fabregas Page 1 of 1

It is certified that error appears in the above-identified patent and that said Letters Patent is hereby corrected as shown below:

On the Title Page

Related U.S. Application Data should read:
Provisional application No. 62/412,242 filed on Oct. 24, 2016

Signed and Sealed this
Eighteenth Day of June, 2019

Andrei Iancu
*Director of the United States Patent and Trademark Office*